United States Patent

[11] 3,604,222

[72] Inventors Werner Wutherich, Sandkrug; Edgar Zelle, Rastede; Heino Gerke, Oldenburg, all of, Germany
[21] Appl. No. 823,782
[22] Filed May 12, 1969
[45] Patented Sept. 14, 1971
[73] Assignee Licentia Patent-Verwaltungs G.m.b.H. Frankfurt am Main, Germany
[32] Priority May 11, 1968
[33] Germany
[31] P 17 60 382.6

[54] STATOR ARRANGEMENT
7 Claims, 2 Drawing Figs.
[52] U.S. Cl. ................................................ 68/24, 310/269
[51] Int. Cl. .............................................. H02k 1/24, D06f 37/36
[50] Field of Search ................................... 68/23, 24, 12; 310/116, 265, 266, 267, 269, 166; 318/229

[56] References Cited
UNITED STATES PATENTS
| 2,475,776 | 7/1949 | Brainard | 310/269 X |
| 3,194,032 | 7/1965 | Von Brimer | 68/24 X |
| 3,355,914 | 12/1967 | Venema et al. | 68/23.7 |
| 3,483,458 | 12/1969 | Kirk | 318/254 X |

Primary Examiner—William I. Price
Assistant Examiner—Philip R. Coe
Attorney—Spencer & Kaye ABSTRACT: A drum-type washing machine includes a drum and an electric motor including a rotor which has a diameter approximately equal to that of the drum and a plurality of salient pole pieces made of soft magnetic material positioned at uniformly spaced angular positions about the rotor, and a segmented stator mounted on the support means and facing only a portion of the circumference of the rotor, the stator including a plurality of separate windings. Each of the stator windings is supplied with electric current at intervals in dependence of the position of the rotor in order to exert a reactance torque on the poles.

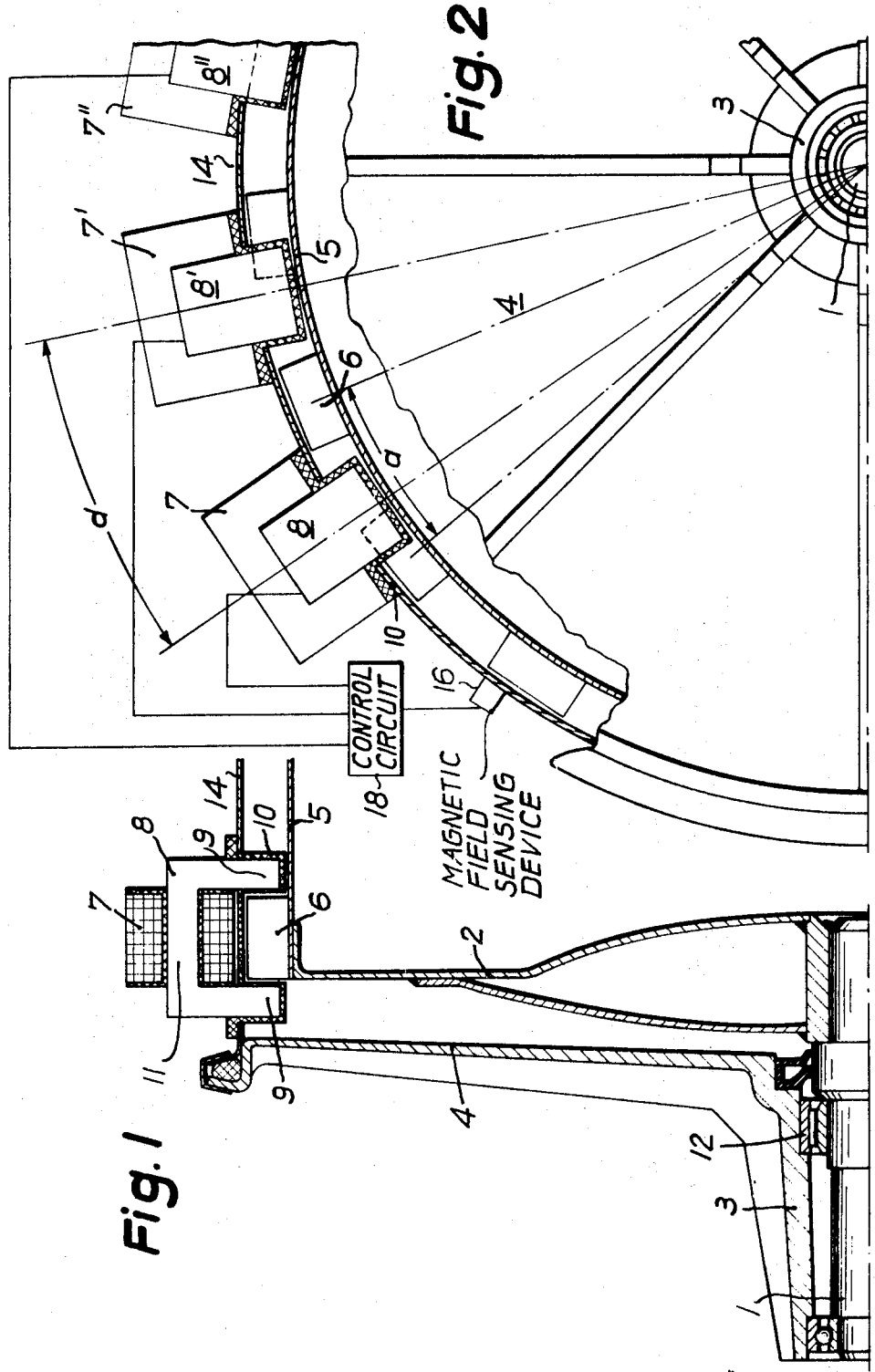

STATOR ARRANGEMENT

BACKGROUND OF THE INVENTION

This invention relates to drum-type washing machines, and more particularly to such a machine in which the drum may be driven directly by the rotor of an electric motor. Use of a direct drive for drum-type washing machines, which conventionally rotate at speeds on the order of 50, r.p.m., avoids the need of gears, belt drives, or other expensive motor speed reduction equipment. However, construction of an induction motor which can directly drive the drum at such a low speed is quite difficult. In known arrangements, both an excessive amount of iron for the rotor pole piece and a large amount of copper wire for the stator windings have been required. For example, one known apparatus uses approximately 100 poles per each winding strand which must be distributed around the rotor periphery. For this reason direct drives have therefore not found much acceptance.

A modified solution has become known for an agitator washer in which a segmented stator induces current in a rotor disc formed of electrically conductive material and which is connected with the drum shaft of the washing machine. This produces an asynchronous torque. The entire thickness of the disc acts as an airgap for the stator so accordingly the utilization of such a motor is low. Again, the required output can be produced only if considerable amounts of material are used. Since the rotor diameter must be very large in order to produce the low number of revolutions required for washing, a motor construction having a laminated squirrel cage rotor including a short-circuited winding would be too expensive. A further drawback of an asynchronous motor of this type is that a production of a second, higher speed of approximately 750 r.p.m. which is necessary for spin drying and is produced for example by pole switching would require a rather large covering angle for the stator of at least 90° for only two poles. The stator iron must be made with a lamination packet which is too thin. In order to additionally be able to produce a low washing speed of approximately 50 r.p.m. the pole pitch of the associated winding would amount to only about one-hundreth of the rotor circumference. In order to avoid such a low pole pitch means must be supplied to artificially reduce the washing speed and the current cycle of the motor is interrupted, for example by a centrifugal switch, before the actual motor speed is reached. This however results in poor efficiency.

SUMMARY OF THE INVENTION

Among the objects of the present invention is the provision of a direct drive for drum-type washing machines which avoids the use of expensive heat reduction gear without use of large amounts of iron for pole pieces or copper for windings.

A further object of the invention is the provision of such a direct drive in which various rates of speed can be produced, and in which switchable poles are not required.

A further object of the invention is the avoidance of the necessity for the complicated insertion of coils into a grooved segmented stator.

The above objects are achieved according to the present invention in that the electric motor for driving the washing machine drum includes a rotor, whose diameter is approximately equal to the outer diameter of the drum and directly connected thereto. The periphery of the rotor is provided with a plurality of uniformly distributed salient poles made of soft magnetic material. The stator for the motor, which is mounted on the support means for the drum and faces only a portion of the circumference of the rotor, is a segmented stator with a plurality of separate windings, i.e., one for each segment. In order to provide the desired reactance torque on the rotor poles current is cyclically supplied to each of the stator windings at intervals in dependence on the angular position of the rotor.

According to the preferred embodiments of the invention, the starter comprises one or more groups of $n$ identical U-shaped magnetic cores, each containing one of the stator windings with the distance between adjacent cores being related to the pitch of the rotor poles.

BRIEF DESCRIPTION OF THE DRAWINGS

FIG. 1 is a sectional view taken on a radial plane of a portion of a drum-type washer according to the present invention, one-half of the diameter of the drive portions being shown.

FIG. 2 is an axial end view of the structure of FIG. 1, a portion being shown in section, and another portion being broken away.

DESCRIPTION OF PREFERRED EMBODIMENTS

Referring to FIG. 1 the shaft 1 of a washing machine drum 2 is mounted for rotation in a bearing 12 mounted in the neck 3 of the front wall 4 of the washing machine. On the cylindrical jacket 5 of the washing drum 2 are mounted a number of soft magnetic salient rotor poles 6 which are disposed at uniform angular distances about the entire circumference of the drum.

At intervals around the circumference of the washing machine support cylindrical jacket 14 which surrounds the drum are groups of U-shaped cores 8 having legs 9 which extend radially from the tub cylinder wall 14 at axially spaced positions. Legs 9 straddle the path in which the rotor poles 6 move as the drum rotates. Windings 7 are wrapped about the center portion 11 of the cores. The portion of the legs 9 which extend into the wash tub are protected against the wash water by sealing pockets 10 of insulating material which surround them.

Referring to FIG. 2 there will be seen a group of three U-shaped cores 8, 8' and 8'' each of which has a one strand winding 7, 7' and 7'' wrapped about its central portion 11. The centers of each of the cores 8 are separated from the adjacent core by uniform angular distance $d$ which is, in the embodiment of FIG. 2, 1⅓ of the rotor pole pitch. The spacing of the cores should be as follows:

$d = (k + 1/n) \times$ (rotor pitch) In this example $n$ is the number of stator cores in the group, the rotor pitch is the angular distance a between adjacent rotor poles 6, and $K$ is any whole number. The spacing of the stator cores about the rotor peripheries can be increased by any desired multiple of this rotor pole pitch since the cores exert no magnetic influence on each other.

A magnetic field sensing device 16 is mounted on the cylindrical tub wall 14 at a position opposite a point on the rotor periphery which is not charged by the stator. Element 16 senses the fluctuations in the magnetic conductivity value produced in the radial direction on the periphery of the rotor. It is connected to a control circuit 18 which cyclically supplies electric current to each of the stator windings 7, 7' and 7'' at intervals in dependence on the position of the rotor means in order to exert a reactance torque on the poles 6.

It should be understood that the embodiment of the invention shown in FIG. 1 and 2 is exemplary only. For example, according to another embodiment of the invention which is generally similar to that of the FIG. 1 and 2 the rotor pole pieces 6 are mounted on a radial or end wall of the drum the cores 8 are mounted on the opposite radial or end wall 4 of the machine. The pole pieces and the stator core spacing are spaced according to the same principles as those of FIG. 1 and 2 embodiment and the current supply is similarly controlled.

Various other embodiments will occur to those skilled in the art, for example, the entire rotor body may be made of cast iron. Particularly suited for example is a material which is known under the trade name of "Sphäroguss."

It would also be possible to construct an embodiment in which a separate rotor body was mounted on the shaft 1 and arranged outside the wash tub.

It will be understood that the above description of the present invention is susceptible to various modifications, changes and adaptations.

We claim:
1. A drum-type washing machine comprising, in combination:
   a. support means;
   b. a drum mounted for rotation on said support means;
   c. an electric motor including
      1. rotor means connected directly to said drum for driving the same and having a diameter which is approximately equal to that of said drum, said rotor means having a plurality of salient pole pieces made of soft magnetic material at uniformly spaced angular positions, and
      2. segmented stator means mounted on said support means and facing only a portion of the circumference of said rotor means, said stator means including a plurality of separate windings; and
   d. means for cyclically supplying electric current to each of said stator windings at intervals in dependence on the position of said rotor means, thereby to exert a reactance torque on said poles.

2. The combination defined in claim 1 wherein said stator means comprises a group containing $n$ ferromagnetic cores of U-shape which are mounted on the support means opposite the rotor at uniformly spaced angular positions, the angular spacing of each core from the next being:

$(K+1/n) \times$ (rotor pole pitch) where $k$ is a whole number $0,1,2,...n$ is the number of cores in the group, and the rotor pole pitch is the angular distance from center to center of adjacent pole pieces.

3. The combination defined in claim 2 wherein there are a plurality of said groups of stator cores.

4. The combination defined in claim 2 wherein said rotor poles are distributed on the periphery of said drum and said stator cores are distributed on a wall connected to the support means which is opposite the periphery of said drum.

5. The combination defined in claim 2 wherein said rotor poles are mounted on a radially extending wall of said drum, and said stator cores are mounted on a wall of the support means which is opposite said drum.

6. The combination defined in claim 1 including means for sensing fluctuations in the magnetic field conductivity in a radial direction on the periphery of the rotor, and means for producing control pulses in response to said fluctuations for commutating current flowing in said stator windings.

7. The combination defined in claim 6 wherein said means for sensing fluctuations include elements mounted on the support means opposite a point on the rotor periphery which is not charged by the stator.